Oct. 28, 1958     F. A. CARLSON, JR     2,857,625
LOW DENSITY EXTRUDED STYRENE POLYMER FOAMS
Filed Aug. 17, 1956
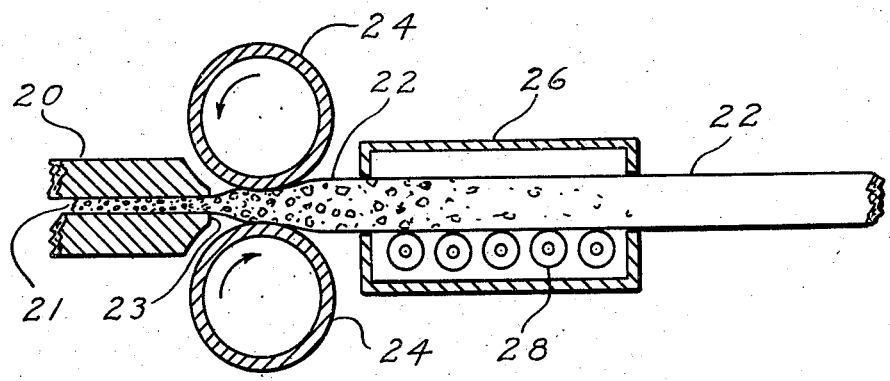
FRANK A. CARLSON JR.    INVENTOR.
BY
ATTORNEY.

2,857,625

LOW DENSITY EXTRUDED STYRENE POLYMER FOAMS

Frank A. Carlson, Jr., Springfield, Mass., assignor to Monsanto Chemical Company, St. Louis, Mo., a corporation of Delaware Application August 17, 1956, Serial No. 604,819

2 Claims. (Cl. 18—48)

The present invention relates to extruded styrene polymer foams having low densities and to methods for preparing same.

Styrene polymer foams constitute a valuable class of resins having wide industrial applications. Foamable styrene polymer compositions containing low-boiling aliphatic hydrocarbons as foaming agents can be fabricated into diverse shapes such as flat sheets, rods, pipe and the like by extruding the foamable styrene polymer compositions from screw-type extruders. Such extruded styrene polymer foams in general have higher densities than can be obtained from the same foamable styrene polymer composition by alternative fabrication techniques. Extruded styrene polymer foams can be subjected to subsequent heat treatments by infrared heaters or hot air to obtain a reduction in the foam density, but the reduction in density that can be obtained by such techniques is small.

It is an object of this invention to provide a method for preparing extruded styrene polymer foams of low density.

Another object of this invention is to provide a method for preparing extruded styrene polymer foams of low density, which method can be adapted to continuous manufacturing processes.

Other objects and advantages of this invention will be apparent from the following detailed description thereof when read in conjunction with the attached drawing which illustrates schematically a continuous method for preparing low density extruded styrene polymer foam sheets.

It has been discovered that extruded styrene polymer foams of low densities can be prepared by contacting an extruded styrene polymer foam with water that is heated to 90° C. or above. The styrene polymer foams whose densities can be reduced by the method of this invention are prepared from styrene polymers having incorporated therein as foaming agents aliphatic hydrocarbons boiling within the range of 10° C.–80° C.

The following examples are set forth to illustrate more clearly the principle and practice of this invention to those skilled in the art. All parts are by weight.

EXAMPLE I

Part A

A foamable styrene polymer composition comprising a styrene homopolymer of 60,000 molecular weight and containing 7% pentane incorporated therein is extruded from a sheet forming die at a temperature of 290° F. and a die pressure of about 500 p. s. i. into the nip of a pair of cooling rolls to form a flat sheet of foamed polystyrene having a density of 4.3 lbs. per cubic foot.

Part B

A segment of the foamed polystyrene sheet prepared in Part A is placed for two minutes in a steam chest maintained at atmospheric pressure and at 100° C. After this treatment, the segment of foamed polystyrene sheet has expanded uniformly in all dimensions and has a density of 1.8 lbs. per cubic foot. For comparison purposes, a similar segment of the foamed polystyrene sheet of Part A is placed for fifteen minutes in a 100° C. circulating air oven. After this treatment, the density of the foamed polystyrene sheet segment is still 3.7 lbs. per cubic foot.

Part C

Another segment of the foamed polystyrene sheet prepared in Part A is placed for one minute in boiling water. After this treatment, the foamed polystyrene sheet segment has a density of 2.4 lbs. per cubic foot.

The extruded styrene polymer foams treated by the method of this invention are prepared from foamable styrene polymer compositions consisting of (1) a suitable styrene polymer and (2) a volatile aliphatic hydrocarbon.

The styrene polymers which may be employed in the invention are homopolymers of styrene and interpolymers of styrene containing a predominant portion of styrene, i. e., greater than 50 weight percent and preferably greater than 75 weight percent styrene. Examples of monomers that may be interpolymerized with the styrene included the conjugated 1,3-dienes, e. g., butadiene, isoprene, etc., alpha-beta-unsaturated monocarboxylic acids and derivatives thereof, e. g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, blends of the styrene polymer with other polymers may be employed, e. g., blends of the styrene polymer with rubbery diene polymers, or the analogous compositions obtained by dissolving a rubbery diene polymer in the styrene monomer and subsequently polymerizing the mixture. In any of the above type polymers, all or a portion of the styrene may be replaced with its closely related homologues such as alpha-methylstyrene, o-, m-, and p-methylstyrene, o-, m-, p-ethylstyrene, 2,4-dimethylstyrene, etc. In general, the styrene polymers employed should have a molecular weight in the range of about 40,000–80,000 (as determined by the Staudinger method).

The volatile aliphatic hydrocarbons included in the foamable styrene polymer compositions boil within the range of from about 10° C. to about 80° C. and preferably within the range of from about 30° C. to about 60° C. Examples of such hydrocarbons include pentane, isopentane, cyclopentane, heptane, petroleum ethers boiling within the previously described temperature ranges, etc. It is permissible, and in some cases desirable, to admix other volatile organic liquids with the aliphatic hydrocarbon. In particular, good results are frequently obtained employing mixtures of volatile aliphatic hydrocarbons and lower halogenated hydrocarbons such as methylene chloride.

If desired, fillers, colorants, light and heat stabilizers, lubricants, foaming additives and other conventional plastic compounding agents may be included in the foamable styrene polymer compositions.

The density of the extruded styrene polymer foams is reduced by contacting the extruded styrene polymer foams with water heated to a temperature of at least 90° C. The heated water employed may be either liquid water or vaporized water, i. e., steam. As the density of the extruded styrene polymer foam is reduced, the extruded foamed article expands substantially uniformly in all dimensions so as to retain its extruded profile.

A continuous method for the preparation of low density styrene polymer foams is illustrated in Fig. 1. A foamable styrene polymer composition, e. g., polystyrene containing 6–8% pentane, is delivered by an extruder (not shown) into an extruder die 20 in a fluid state above its melting point, but foaming within the extruder and the extruder die is suppressed by maintaining the plastic mass under a pressure of at least 150 p. s. i. The plastic mass is extruded in sheet form through orifice 23 of channel 21, and the sudden pressure drop (extruder pressure to atmospheric pressure) causes rapid foaming of sheet 22. The orifice 23 is positioned very close to the nip of rolls 24 and sheet 22 contacts the rolls before it has completely foamed. The expansion of the styrene polymer forces the sheet 22 into pressured engagement with the rolls 24 thereby providing smooth, wrinkle-free surfaces on the sheet. After leaving rolls 24, the sheet 22 is passed through chest 26 in which steam is circulated by means not shown. The sheet is transported through chest 26 by conveying rolls 28.

The above descriptions and particularly the examples are set forth by way of illustration only. Many other variations and modifications thereof will be apparent to those skilled in the art and can be made without departing from the spirit and scope of the invention herein described.

What is claimed is:

1. In a continuous method for preparing a low density extruded sheet of a foamed styrene polymer in which a styrene polymer having incorporated therein as a foaming agent an aliphatic hydrocarbon boiling within the range of 10–80° C. is extruded at an elevated temperature from a sheet forming die directly into the nip of a pair of driven cooling rolls; the improvement which comprises contacting said sheet with steam after it has passed through said cooling rolls.

2. In a continuous method for preparing a low density extruded sheet of a foamed styrene polymer in which a styrene polymer having incorporated therein as a foaming agent an aliphatic hydrocarbon boiling within the range of 10–80° C. is extruded at an elevated temperature from a sheet forming die directly into the nip of a pair of driven cooling rolls; the improvement which comprises contacting said sheet with water heated to a temperature of at least 90° C. after it has passed through said cooling rolls.

References Cited in the file of this patent

UNITED STATES PATENTS

| | | |
|---|---|---|
| 2,537,977 | Dulmage | Jan. 16, 1951 |
| 2,774,991 | McCurdy et al. | Dec. 25, 1956 |
| 2,779,062 | Stastny | Jan. 29, 1957 |